United States Patent [19]

Igarashi

[11] Patent Number: 4,797,813
[45] Date of Patent: Jan. 10, 1989

[54] CACHE MEMORY CONTROL APPARATUS

[75] Inventor: Tetsu Igarashi, Fuchu, Japan

[73] Assignee: Kabushiki Kaisha Toshiba, Kawasaki, Japan

[21] Appl. No.: 941,385

[22] Filed: Dec. 15, 1986

[30] Foreign Application Priority Data

Dec. 20, 1985 [JP] Japan ............... 60-286937

[51] Int. Cl.⁴ .............................. G06F 12/04
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 3,581,287 | 5/1971 | Greenspan | 364/200 |
| 4,298,929 | 11/1981 | Capozzi | 364/200 |
| 4,345,309 | 8/1982 | Arulpragasam et al. | 364/200 |
| 4,370,710 | 1/1983 | Kroft | 364/200 |
| 4,520,439 | 5/1985 | Liepa | 364/200 |
| 4,654,781 | 3/1987 | Schwartz et al. | 364/200 |

Primary Examiner—Gareth D. Shaw
Assistant Examiner—Rebecca L. Adams
Attorney, Agent, or Firm—Finnegan, Henderson, Farabow, Garrett & Dunner

[57] ABSTRACT

A cache memory control apparatus according to the present invention includes data register blocks which are individually controlled for each byte, cache memory blocks, and a decoder for generating control signals which control the access to those blocks. In this cache memory control apparatus, when a cache hit is made in a write mode for byte data, the control signal is supplied to the data register blocks and cache memory blocks to individually control the respective blocks, thereby allowing word data corresponding to the write byte data to be synthesized. Thus, the word data can be output to an external device by one operation.

9 Claims, 5 Drawing Sheets

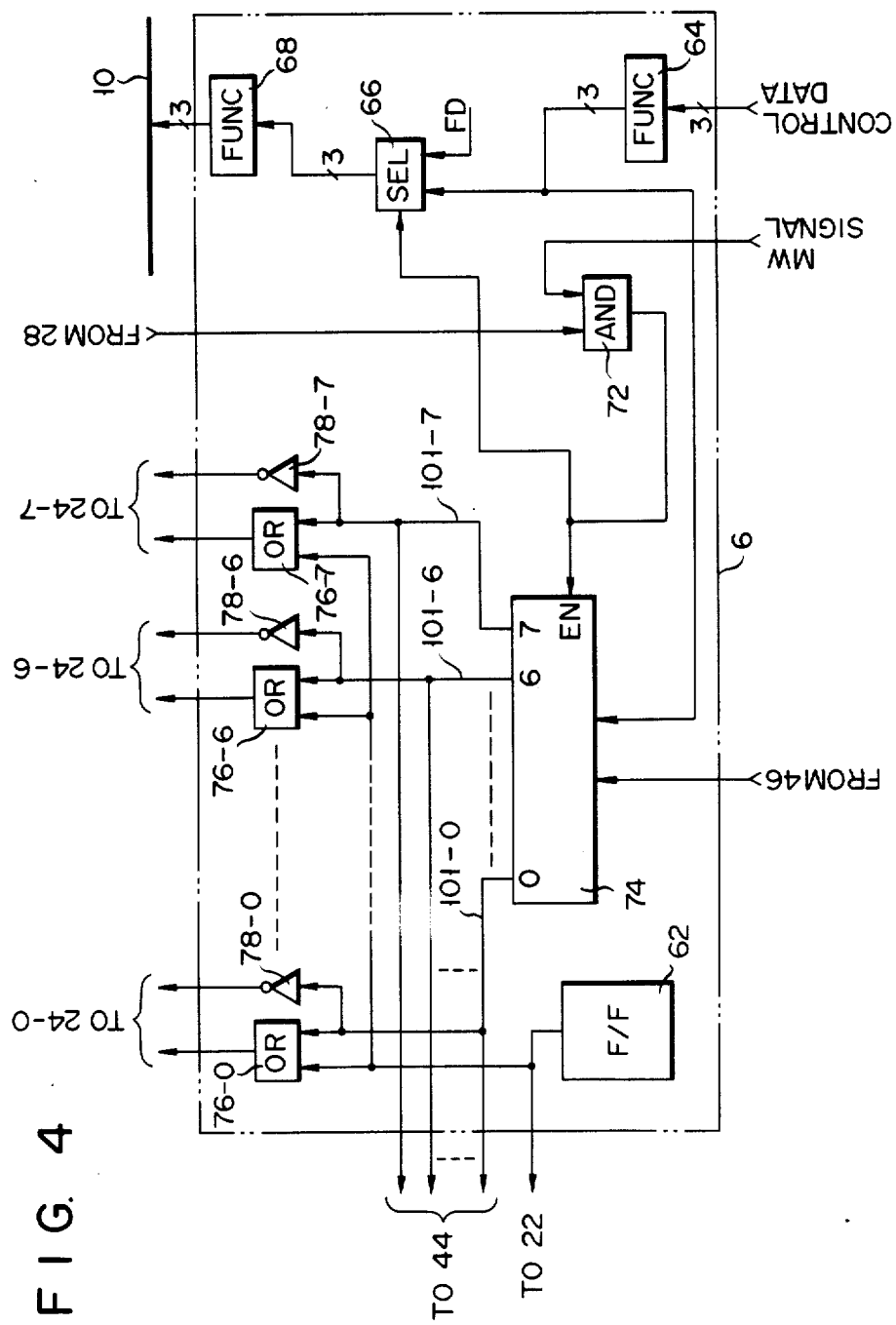
F I G. 4

| BITS | | | MEANING |
|---|---|---|---|
| 1 | 0 | 0 | N |
| 1 | 0 | 1 | BYTE WRITE |
| 1 | 1 | 0 | HALF-WORD WRITE |
| 1 | 1 | 1 | FULL-WORD WRITE |
| 0 | 0 | 0 | N |
| 0 | 0 | 1 | BYTE READ |
| 0 | 1 | 0 | HALF-WORD READ |
| 0 | 1 | 1 | FULL-WORD READ |

CACHE MEMORY CONTROL APPARATUS

BACKGROUND OF THE INVENTION

The invention relates to a cache memory control apparatus suitable for an arithmetic control unit (ACU) having a cache memory and, more particularly, to a cache memory control apparatus which can prevent partial write of data at a cache hit in a write mode and reduce occupying time of a main memory.

Generally, when a memory write instruction or request for a main memory is generated, in the cache memory control apparatus of an arithmetic control unit, a directory check is performed to determine whether a cache hit has been made, i.e., if data in a block of an address specified by the memory write instruction is stored in the cache memory. If a cache hit has been made, a directory corresponding to the block specified by the memory write instruction is cancelled to invalidate the data in the corresponding block in the cache memory. In this state, a write operation is performed for the main memory. This write operation may result in a partial write or in a read-modified write when data to be written is not word-length data, but byte-length data. In a case where one word is N-times (where N is an integer) as large as a minimum unit of data to be processed in the arithmetic control unit (for example, one word consists of 8 bytes) and where at least one byte of write data is written into the main memory, associated one-word data is read out therefrom, and the write data is substituted for data in associated one-word data corresponding thereto. The substituted word data is then written into the main memory. In the prior art cache memory control apparatus, there is a strong possibility that the write operation for the main memory may result in a partial write. Thus, a partial write results in two operations of read and write for the same block in the main memory, thereby disadvantageously requiring approximately twice as much time as is required for the word write operation.

Further, the prior art cache memory control apparatus has a problem, in that the cache hit rate is reduced, since the associated directory is cancelled when a cache hit is made at the write operation. To prevent this problem from occurring, in place of cancelling the associated directory, it has been proposed to read out the word data in the associated block containing the write data after the write data has been written in the main memory. Such a method, however, only performs beforehand the operation to be performed when a hit is not made and does not provide any efficient solution.

SUMMARY OF THE INVENTION

Accordingly, an object of the present invention is to provide a cache memory control apparatus in which, when a cache hit is made during a memory write for an external device in which one word consists of n bytes, the occurrence of a partial write (read, modify, write) operation can be prevented. Another object of the present invention is to ensure that the associated directory is not cancelled during a partial write operation, thereby enhancing the cache hit rate.

To attain this object, in accordance with the present invention, there is provided a cache memory control apparatus comprising cache dta storage means for checking if input address data has made a cache hit, and for reading out and outputting data in a remaining field except for a partial write field of one word write data, from a cache memory for storing copy data from the main memory, in accordance with the address data when the cache hit is made, control means for generating a second control signal, in accordance with predetermined bit data of the address data and access control data for specifying data width with which the main memory is accessed in response to a first control signal generated by the cache data storage means when the cache hit has been made, for generating a third control signal for accessing the cache memory in response to the second control signal, and for outputting the access control data indicative of write with one word width in response to the first control signal, and data and address output means for synthesizing the data output from the cache memory and input partial write data as the one word write data in response to the second control signal from the control means, and for outputting the synthesized one word write data to the main memory together with the address data.

According to the present invention as described above, when a cache hit has been made at the memory write operation, the occurrence of the partial write, i.e. read-modified write can be prevented even if required write access width is not full word width. Therefore, the time when a main memory is occupied by one arithmetic control unit is reduced and the waiting time of another unit is shortened, so that the system performance can be remarkably enhanced, in particularly, a multiprocessor system having plural arithmetic control units.

Further, according to this invention, when a cache hit is made at the memory write operation, an original write data is written in a field corresponding to the original write data in the associated block in the cache memory, so that the data of the associated block can be renewed without accessing the main memory. Therefore, the associated directory is not required to be cancelled, thereby enhancing the cache hit rate.

The above and other objects, features, and advantages of this invention will be more closely understood from the following detailed description, taken in conjunction with the accompanying drawings, in which like reference numerals refer to like parts in the several views.

BRIEF DESCRIPTION OF THE DRAWINGS

FIG. 4 is a block diagram showing the details of the control section of FIG. 1;

DETAILED DESCRIPTION OF THE PREFERRED EMBODIMENT

Hereinafter, referring to the attached drawings, an embodiment of the cache memory control apparatus according to this invention will be explained in detail.

Figure 1:
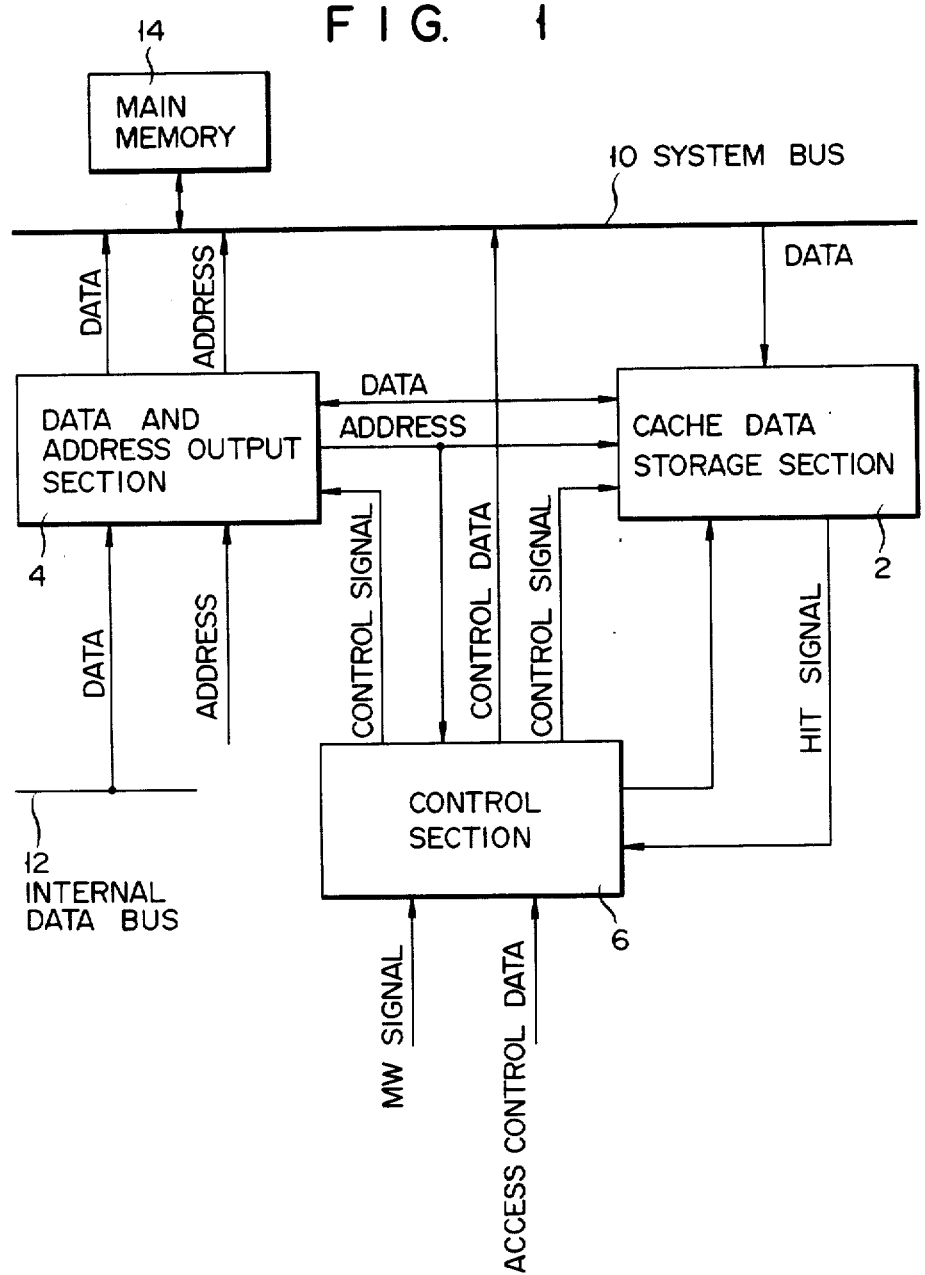
FIG. 1 is a block diagram of a cache memory control apparatus in accordance with an embodiment of the present invention.
Figures 5, 6:
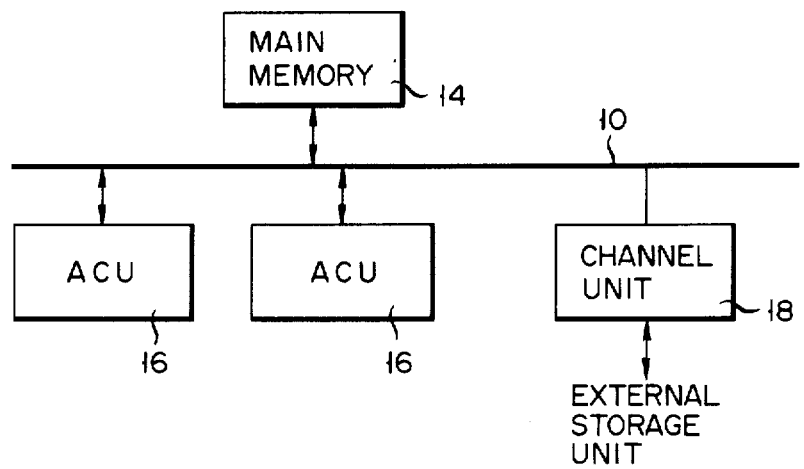
FIG. 5 is a table indicating the codes and meanings of access control data.
FIG. 6 is a block diagram showing an arrangement of the multiprocessor system in which a plurality of arithmetic control units contain the cache memory control apparatus of the present invention.

FIG. 1 shows the embodiment of the cache memory control apparatus according to the invention. FIG. 6 shows a multiprocessor system having a plurality, (for example, two) of arithmetic control units (ACU) 16 with the cache memory control apparatus, as shown in FIG. 1, being incorporated therein.

As shown in FIG. 6, ACU's 16 are connected to system bus 10. Width of a data bus (not shown) in system bus 10 is $2^n$ bytes. For example, if $n=3$, system bus 10 is 8 bytes wide. System bus 10 is connected to main memory 14 in which one word consists of 8 bytes each having a allocated address for data input/output control, etc.

Referring now to FIG. 1, the embodiment of the cache memory control apparatus, according to this invention, within arithmetic control unit (ACU) 16 comprises cache data storage section (storage section) 2, data and address output section (output section) 4, and control section 6.

Storage section 2 checks if a 32-bit address sent from output section 4 makes a cache hit, in a memory write mode. If the cache hit has been made, storage section 2 generates a HIT signal and sends it to control section 6. Further, storage section 2 outputs a part of associated cache data to output section 4 on a DATA line in response to a control signal from control section 6.

Output section 4 outputs an address previously input from another part (not shown) of ACT 16 to storage section 2 and control section 6, and also outputs the address to main memory 14. Output sections 4 latches write data from internal data bus 12, and receives the part of the associated cache data from the storage section 2 in response to a control signal from control section 6. At this time, output section 4 combines these data to form full word data, and outputs the write data to storage section 2 at the same time. The combined full word data is output to system bus 10.

Control section 6, in response to the HIT signal from storage section 2 and a memory write (MW) signal input from another part (not shown) of ACU 16, generates the control signal in accordance with access control data from another part (not shown) of ACU 16 and the address from output section 4, and outputs the generated control signal to storage section 2 and output section 4. Control section 6 also outputs the received access control data or the access control data indicative of full word write to system bus 10 in accordance with the HIT signal.

The details of each section will be explained with reference to FIGS. 2–5.

Figure 2:
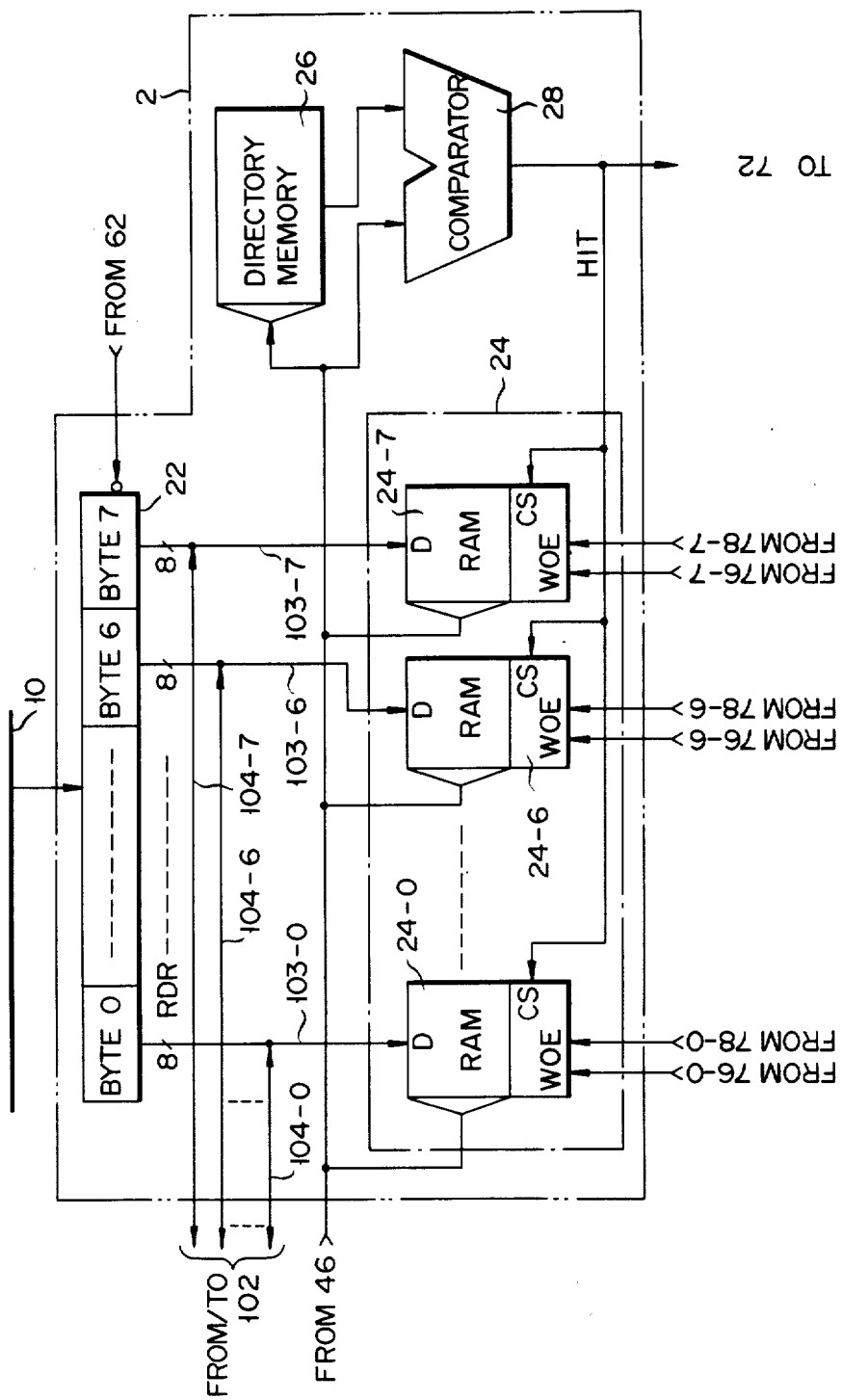
FIG. 2 is a block diagram showing the details of the cache data storage section of FIG. 1.

First, the details of cache data storage section 2 will be explained with reference to FIG. 2. Storage section 2 comprises read data register (RDR) 22, cache memory 24, directory memory 26, and comparator 28. RDR 22, connected to system bus 10, latches 8-byte wide data output from, for example, main memory 14, synchronous with a clock signal from a flip-flop 62 described below. Consecutive bytes of the latched 8-byte data are numbered 0–7, respectively.

Cache memory 24 includes eight cache blocks, i.e., cache RAMs 24-0 through 24-7 which can be individually controlled and in which one word is eight bytes long. Each cache RAM 24-i has, as control terminals, a read/write mode terminal (w) for controlling the readout mode and the write-in mode, an output enable terminal (OE) for controlling an output of data stored therein, and a chip select terminal (CS) for controlling the access of the RAM chip. When proper control signals are input to these terminals, each cache RAM 24-i stores data at an input address or outputs the data stored therein. Each cache RAM 24-i is connected with a corresponding i-th byte portion of RDR 22 through a data line 103-i.

Directory memory 26 stores the directory information corresponding to data stored in cache memory 24 and outputs the directory information corresponding to an input address.

Comparator 28 compares the input address and the directory information from directory memory 26 and outputs the HIT signal when they coincide with each other, i.e., when a cache hit has been made. The output HIT signal is supplied to the CS terminal of each cache RAM 24-i in cache memory 24 to place it in an accessed state.

Figure 3:
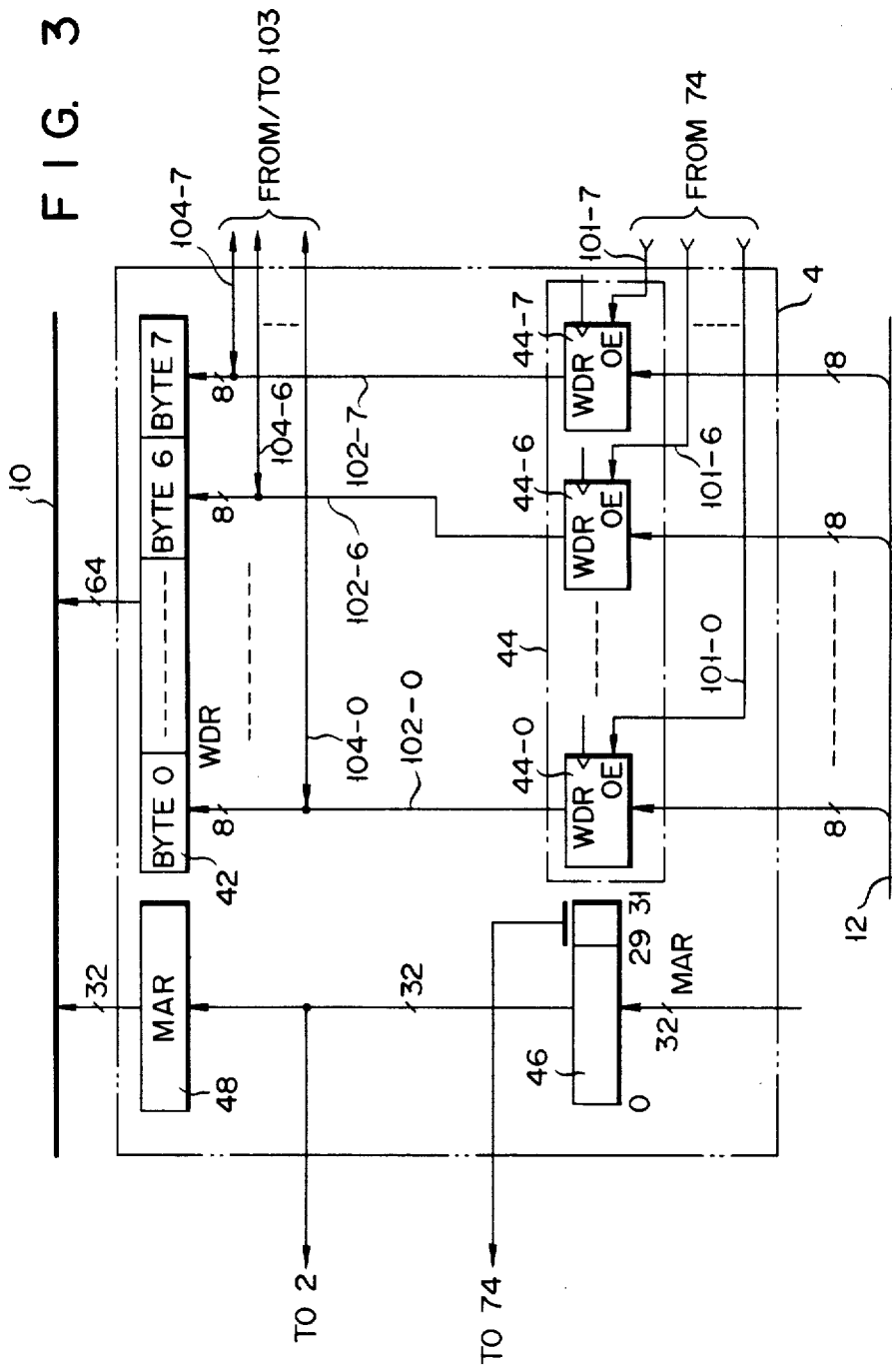
FIG. 3 is a block diagram showing the details of the data and address output section of FIG. 1.

Next, the details of data and address output section (output section) 4 will be explained with reference to FIG. 3. Data and address output section 4 includes write data registers (WDR's) 42 and 44 and memory address registers (MAR's) 46 and 48. Write data register 42 outputs 8-byte wide data one line 64 latched, for example, to main memory 14 through system bus 10. Write data register 44 has eight write data register blocks 44-0 through 44-7 which can be individually controlled and in which one word is eight bytes long. Each register block 44-i receives one-byte wide write data from internal data bus 12 on line 8 in accordance with a clock signal (not shown). Each data register block 44-i has three states as an output, i.e., a high level, a low level, and a high impedance state when the output is inhibited. The data output of each register block 44-i is connected with the corresponding i-th byte portion of data register 42 through data lines 102-i.

Data line 102-i in output section 4 and data line 103-i in storage section 2 are connected by data line 104-i, so that the connection points between data lines 102-i and 104-i, and 103-i and 104-i are formed in a wired-OR. Each register block 44-i outputs the latched data byte to data line 102-i in accordance with a control signal 101-i from control section 6.

Memory address register 46 latches an input address, outputs and 32-bit width memory address latched therein to storage section 2, and outputs to the control section 5, predetermined low order bits, e.g., low order three bits, since in this embodiment one word is constituted by 8 bytes. Memory address register 46 also outputs the latched address to memory address register (MAR) 48. Memory address register 48, connected with system bus 10, outputs the address from register 46 to system bus 10.

Next, the details of control section 6 will be explained with reference to FIG. 4. Control section 6 includes flip-flop (F/F) 62, function registers (FUNCs) 64 and 68, selector (SEL) 66, AND gate (AND) 72, decoder 74, OR gates (OR's) 76-0 through 76-7, and inverters 78-0 through 78-7.

AND 72 is supplied with the HIT signal from storage section 2 and a memory write signal (MW) from an external unit (not shown). An output of AND 72 is supplied to decoder 74 and SEL 66.

FUNC 64 receives 3-bit access control data from the external unit and supplies it to SEL 66 and decoder 74. The received 3-bit access control data has the meanings as shown in the Table of FIG. 5. Namely, "0" of the most significant bit represents read access, while "1" thereof represents write access. "01" of the remaining two bits represents byte access, "10" thereof represents half word access, and "11" thereof represents full word access. Thus, "101" of the input control data means byte write.

Decoder 74 inputs the access control data from FUNC 64 and the address from memory address register 46 in response to a control signal from AND 72, and generates a 8-bit control signal 101-i. F/F 62 is made active during one clock when the read data is transferred from main memory 14 (clock line not shown), and outputs the obtained active signal to OR 76-i. OR 76-i is also supplied with the control signal 101-i from decoder 74 and its output is supplied to the read/write mode terminal of the cache RAM 24-i of storage section 2. Inverter 78-i receives the control signal 101-i from the decoder 74, inverts it, and supplies the inverted control signal to the OE terminal of cache RAM 24-i of storage section 2.

Next, operation of the embodiment of this invention will explained.

It is now assumed that a memory write request for main memory 14 has been generated in arithmetic control unit 16, so that a 32-bit memory address has been set in memory address register (MAR) 46 and a 3-bit access control data has been set in function register (FUNC) 64. It also is assumed that each data byte of the write data (minimum 1 byte, maximum 8 bytes) for main memory 14 has been set in data register block 44-i corresponding to the write data.

In this state, a directory check cycle is started. More specifically, the address from MAR 46 is supplied to directory memory 26 and the directory information is retrieved by a predetermined field (column address) of the address from MAR 46. Comparator 28 checks if the directory information from directory memory 26 and a predetermined part of the address from MAR 46 coincide with each other. If coincidence is present, the comparator 28 outputs a HIT signal of logic "1" representing the cache hit. Otherwise, if no coincidence is present, comparator 28 outputs a HIT signal of logic "0" representing the cache miss.

This HIT signal is sent to AND gate 72. AND gate 72 is also supplied with the MW signal representing memory write, which is logic "1" when a memory write request has been generated. Therefore, AND gate 72 outputs a control signal of logic "1" when the HIT signal and the MW signal are logic "1", i.e., when a cache hit is made in the memory write mode.

The decoder 74, when the control signal from AND 72 is logic "1", decodes a combined data of 6 bits consisting of the 3-bit access control data set in the FUNC 64 and the low order 3 bits of the address from MAR 46, to generate the 8-bit control signal 101-i. At this time, only the control signal components 101-i corresponding to byte positions of the write data to be written in main memory 14 are logic "1". Therefore, when only a K-th ($0 < K < 7$) byte data is written, the access control data is "101" as understood from FIG. 5 and only the component 101-K of the control signal 101-i from decoder 74 is logic "1". If a half word is written, the access control data is "110", and the components 101-0 to 101-3 or 101-4 to 101-7 are logic "1" in accordance with the address from the MAR 46.

For example, the case where a seventh byte of data is written into main memory 14 will be explained below. When the seventh data byte is to be written into main memory 14, the write byte data has been set in only the data register block 44-7. When only the component 101-7 of the control signal 100-i output from decoder 74 is logic "1", effective control signal component 101-7 is supplied to the read/write mode terminal of cache RAM 24-7 through OR 76-7, so that cache RAM 24-7 changes its state from the read-out mode to the write-in mode. Also, only data register block 44-7 changes its state from the output disable state to the output enable state, so that the write byte data latched in block 44-7 is output to data line 102-7. the write byte data on data line 102-7 is supplied to the data input/output port D of cache RAM 24-7. Since cache RAM 24-7 is in the write-in mode, the write byte data from data register block 44-7 is stored at an address specified by the predetermined field (column address) of the memory address latched in MAR 46.

On the other hand, remaining cache RAM's 24-0 to 24-6 maintain their read-out mode since the control signal 101-0 to 101-6 output from decoder 74 are logic "0", and their OE terminals are supplied with the control signal 101-0 to 101-6 through the inverters 78-0 to 78-6, thus enabling the output of the cache RAM's 24-0 to 24-6, respectively. Therefore, from each of cache RAM's 24-0 to 24-6, the cache byte data stored at the address specified by the predetermined field (column address) of the input address is read out onto data lines 103-0 to 103-6, respectively. Data line 103-i is connected with data line 102-i through data line 104-i so as to constitute a wired-OR at the connected points, respectively, and the 7-byte data read out from cache RAMs 24-0 to 24-6 is supplied to the data line 102-0 to 102-6, respectively. Data register blocks 44-0 to 44-6 are in the output disabled state since the control signal components 101-0 to 101-6 are logic "0". Thus, their outputs are in a high impedance state and the byte data read out from cache RAM's 24-0 to 24-6 is wired-OR'ed to be written in the 0- to 6-th byte data position of write data register (WDR) 42. In the seventh byte data position of WDR 42, the write byte data from data register block 44-7 is written. Accordingly, WDR 42 latches the full word data as the write data for main memory 14. Namely, although the write of one byte data is requested, when the cache hit is made, one word data is set in WDR 42 as write data for main memory 14 through one memory cycle.

Meanwhile, selector (SEL) 66 is supplied with both the access control data from FUNC 64 and the access control data FD indicative of full word write, and selectively outputs one of them in accordance with the control signal from AND 72. Namely, if the output signal from AND 72 is logic "0", SEL 66 outputs the access control data latched in the FUNC 64, the access control data being "101" indicative of byte data write. If the output signal from AND 72 is logic "1", SEL 66 outputs the access control data FD "111" indicative of the full word write. The access control data from SEL 66 is latched in FUNC 68 with a timing of writing 8-byte data in WDR 42. The address set in MAR 46 is set in MAR 48.

Thereafter, the 8-byte data or full word data in WDR 42, the memory address in MAR 48 and the access control data in FUNC 68 are transferred to main memory 14 through system bus 10 to write the full word data in main memory 14.

In order to store the read data from main memory 14, 8-byte data is input to read data register 22 (in response to the clock from F/F 62. F/F 62 generates one clock pulse when the data read is requested. When the read data from main memory 14 is latched by read data register 22, the clock from F/F 62 is also supplied to the cache RAM 24-i through OR 76-i. Then, since the control signal 101-i from decoder 74 is logic "0", cache RAM 24-i is inhibited in its data output. Each cache RAM 24-i is also specified in the write-in mode. Thus, when a control signal is supplied to the chip select terminal CS of cache RAM 24-i, the read data from main memory 14 is stored in cache RAM 24-i in accordance with the address input.

What is claimed is:

1. An apparatus for performing a partial write operation of at least one byte of partial write data to an address of a word in a main memory wherein data is stored in words of multiple bytes, comprising:

cache means for storing cache data in addressable words containing a plurality of bytes capable of being individually enabled for reading and writing, for determining in accordance with the main memory address whether the main memory address causes a cache hit, for selectively generating a cache hit signal in accordance with the determined result, for outputting at least one byte of cache data from a byte enabled for reading and designated by the main memory address in accordance with negation of a first control instruction input thereto, and for inputting and storing the partial write data at all bytes enabled for writing of a word at a cache address corresponding to the main memory address in accordance with said first control instruction;

address and data output means for receiving the main memory address and the partial write data, for outputting the main memory address to said cache means, for combining the outputted cache data and the partial write data in accordance with a second control instruction input thereto, and for outputting the partial write data to said cache means in accordance with said second control instruction such that said combining and said outputting the partial write data to cache are simultaneously performed; and control means for selectively generating the first and second control instructions from the main memory address, for generating an input access control data indicating a byte width of the partial write data in accordance with the hit signal, and for outputting said first control instruction to said cache means wherein negation of said first control instruction enables at least one byte in a word of said cache means for reading, and wherein said first control instruction enables for all other bytes in said word for writing, and for outputting said second control instruction to said address and data output means.

2. The apparatus according to claim 1, wherein said control means comprises:

first generating means for selectively generating said second control instruction from the main memory address and said access control data in accordance with said cache hit signal; and second generating means for generating said first control instruction in accordance with said second control instruction.

3. The apparatus according to claim 1, wherein said cache means comprises:

cache memory means for storing cache data bytes in words having multiple bytes, for selectively outputting cache data bytes in accordance with the main memory address and negation of said first control instruction, wherein said outputted cache data bytes are the cache data stored at a cache address corresponding to the main memory address and not corresponding to the partial write data, and for selectively storing write data bytes consisting of the partial write data in accordance with the main memory address and said first control instruction;

directory means for storing said cache address corresponding to the main memory address, and for outputting the cache address in accordance with the main memory address; and hit signal generating means for comparing the cache address and the main memory address to determine whether the main memory address indicates the cache hit, and for generating the cache hit signal when the main memory address causes the cache hit.

4. The apparatus according to claim 3, wherein said address and data output means comprises:

first data latch means for latching the partial write data in units of bytes, and for selectively outputting the write data bytes to said cache means in accordance with said second control instruction;

second data latch means for latching the partial write data from said first data latch means and the outputted cache data from said cache memory means; and address latch means for latching the main memory address therein, and for outputting the main memory address to said cache means and said control means.

5. An apparatus for performing a partial write operation of partial write data to an address of a word in a main memory, said apparatus comprising:

cache memory means consisting of bytes capable of being individually enabled for reading and writing, for storing cache data bytes constituting cache data words, and for selectively outputting ones of said cache data bytes associated with the main memory address input thereto and enabled for reading, in accordance with a first control instruction input thereto;

hit signal generating means for selectively generating a cache hit signal in accordance with the main memory address input thereto;

register means for latching write bytes input thereto, said write bytes constituting the partial write data, and for selectively outputting said latched write bytes to said bytes of said cache memory means enabled for writing simultaneously with said output of cache data bytes from said bytes of said cache memory address enabled for reading and in accordance with a second control instruction input thereto;

data combining means for combining the ones of said cache data bytes outputted from said bytes of said cache memory means enabled for reading and said write bytes latched from said register means to constitute a write word having a number of bytes equal to a sum of the number of outputted cache data bytes and the number of write bytes;

control means for receiving input access control data indicating a byte width of the partial write data, for generating said first and second control instructions from the main memory address input thereto and from said input access control data in accordance with the cache hit signal, and for outputting said first control instruction to said cache memory means, wherein said first control instruction enables at least one byte for writing and negation of said first control signal enables the other bytes in the same word for reading, and for outputting said second control instruction to said register means.

6. The apparatus according to claim 5, wherein said control means comprises:

first generating means for generating said second control instruction from the main memory address and said access control data in accordance with the cache hit signal; and second generating means for generating said first control instruction in accordance with said second control instruction.

7. The apparatus according to claim 5, wherein said register means further comprises means for selectively outputting said write bytes to said cache memory means in accordance with said second control instruction, and wherein said cache memory means further comprises means for selectively storing said write bytes in accordance with said first control instruction.

8. A method of performing a partial write operation, of partial write data to an address of a word in a main memory, said method comprising:

selectively generating a cache hit signal in accordance with the main memory address:

latching write bytes into data registers, said write bytes included in said partial write data;

simultaneously generating a first and a second control instruction responsive to the main memory address and an access control data indicating byte width of the partial write data, in accordance with the generated cache hit signal;

outputting said first control instruction to said cache memory including cache data words each consisting of a plurality of cache data bytes capable of being individually enabled for reading and writing;

enabling at least one of said cache data bytes for reading and the rest of said cache data bytes for writing according to said first control instruction;

outputting said second control instruction to said data registers containing said partial write data;

selectively outputting ones of the cache data bytes associated with the main memory address and enabled for reading from the cache memory to a data latch in accordance with said first control instruction;

selectively outputting the write bytes from the each data register to the data latch in accordance with said second control instruction;

combining said cache data bytes from said cache memory and said write data bytes from said data register; and selectively outputting the latched write bytes to the bytes of the cache memory enabled for writing in accordance with said second control instruction.

9. The method according to claim 8, further comprising selectively storing latched write bytes in the cache memory in accordance with said first control instruction.

* * * * *